United States Patent [19]

Esters

[11] 4,114,057

[45] Sep. 12, 1978

[54] DYNAMOELECTRIC MACHINE WITH INNER AND OUTER STATORS

[76] Inventor: Ernie B. Esters, 15915 Rutherford, Detroit, Mich. 48227

[21] Appl. No.: 748,091

[22] Filed: Dec. 6, 1976

[51] Int. Cl.² ............................................. H02K 37/00
[52] U.S. Cl. ..................................... 310/46; 310/266; 310/154
[58] Field of Search .................. 310/43, 49, 152, 154, 310/159, 266, 46

[56] References Cited

U.S. PATENT DOCUMENTS

| 3,396,296 | 8/1968 | Esters | 310/266 |
| 3,502,914 | 3/1970 | Cox | 310/43 X |
| 3,602,749 | 8/1971 | Esters | 310/154 |

*Primary Examiner*—Donovan F. Duggan
*Attorney, Agent, or Firm*—Hauke and Patalidis

[57] ABSTRACT

A dynamoelectric machine having coaxial inner and outer stators and, preferably, also end stators, each stator being provided with a plurality of magnetic flux producing magnets, preferably of the permanent magnet type. The rotor has a hollow cylindrical configuration and is rotatably disposed such as to form a plurality of magnetic gaps between the inner stator, outer stator and end stators and a plurality of magnetic cores supported by the rotor and provided with appropriate windings, the stator magnetic cores having projections interreacting with corresponding magnets forming the stators.

15 Claims, 4 Drawing Figures

4,114,057

DYNAMOELECTRIC MACHINE WITH INNER AND OUTER STATORS

CROSS-REFERENCE TO RELATED PATENTS

The present application relates to an improvement on Pat. No. 3,602,749, for "Dynamoelectric Machine", issued Aug. 31, 1971 and Pat. No. 3,729,642, for "Plural Stator Dynamoelectric Machine", issued April 24, 1973.

BACKGROUND OF THE INVENTION

The present invention relates to dynamoelectric machines capable of operating either in a generator mode or in a motor mode and, more particularly, the present invention relates to dynamoelectric machines of the radial- and axial- gap-type.

Dynamoelectric machines, motors and generators, are generally of the radial magnetic gap type, being provided with an annular peripheral stator and a cylindrical rotor disposed internally of the stator. Electrical current supplied to the windings of the rotor or stator, or to the windings of both, generates electromagnetic fields in the rotor or in the stator, as the case may be. In electric motors, the electromagnetic fields react with each other or with magnetic fields created by permanent magnets to produce forces of attraction or repulsion between the rotor and the stator which in turn cause the rotor to rotate in unison with a shaft supporting the rotor. In electrical generators, the rotation of the rotor causes an electromotive force to be induced in the windings. In such dynamoelectric machines, the attraction and repulsion forces, and the induced electromotive forces, are created at the cylindrical magnetic interface or gap between the rotor and the stator.

Another type of dynamoelectric machine, often referred to as the axial gap type, is provided with a disc-shaped rotor keyed to a rotatable shaft. The stator or stators are axially arranged relative to the rotor such that the magnetic interface or gap, through which the attraction or repulsion forces of the magnetic fields are exerted and the variable magnetic fields inducing an electromotive force are created, respectively in motors and in generators, are axially or longitudinally aligned with respect to the housing and rotatable shaft of the dynamoelectric machine.

A third type of dynamoelectric machines, best represented by the structures disclosed in the above-mentioned U.S. Pat. Nos. 3,602,749 and 3,729,642 and also in U.S. Pat. Nos. 3,426,224 and 3,396,296, all issued to applicant, presents the combined advantage of both the radial gap and axial gap dynamoelectric machines. In such structures, a first stator is disposed within a hollow cylindrical rotor and a second stator, also cylindrical in shape, is disposed such as to surround the rotor. A double radial gap dynamoelectric machine is thus formed. In addition, end stators are provided on the lateral ends of the rotor so as to form an axial gap between the ends of the rotor and the magnetic field created by the end stators. An electric motor, or an electric generator, built according to such principle has a greater efficiency than conventional motors or generators, as a result of the greatly increased interreaction between a multitude of magnetic fields and electromagnetic fields.

SUMMARY OF THE INVENTION

The present invention has for principal object the provision of electric motors or generators of the axial and radial gap type wherein attraction and repulsion forces, in a motor configuration, or induced EMF, in a generator configuration, are produced at a maximum effective number of interfaces between the rotor magnetic cores and the stators magnets, preferably permanent magnets, resulting in a very efficient dynamoelectric machine.

More particularly, the present invention contemplates further improving the efficiency of the dynamoelectric machines disclosed in U.S. Pat. Nos. 3,602,749 and 3,729,642 by disposing the windings of the rotor around magnetic cores provided with end extensions, such end extensions projecting radially outwardly and inwardly relative to the rotor windings, and disposing additional magnets in the stators for interreacting with the magnetic core extensions, such as to further increase the efficiency of the dynamoelectric machine. In addition, a further object of the present invention contemplates an improved support and journal construction for the rotor magnetic cores and winding assemblies by providing massive end hubs for the magnetic cores, with the inwardly radially projecting core projections press-fitted in appropriate radial slots formed in the support hubs.

BRIEF DESCRIPTION OF THE DRAWINGS

The several objects and advantages of the present invention will become apparent to those skilled in the art when the following description of the best mode contemplated for practicing the invention is read in conjunction with the accompanying drawing wherein like reference numerals refer to like parts throughout the several views and in which.

DETAILED DESCRIPTION OF THE PREFERRED EMBODIMENT

Figure 1:
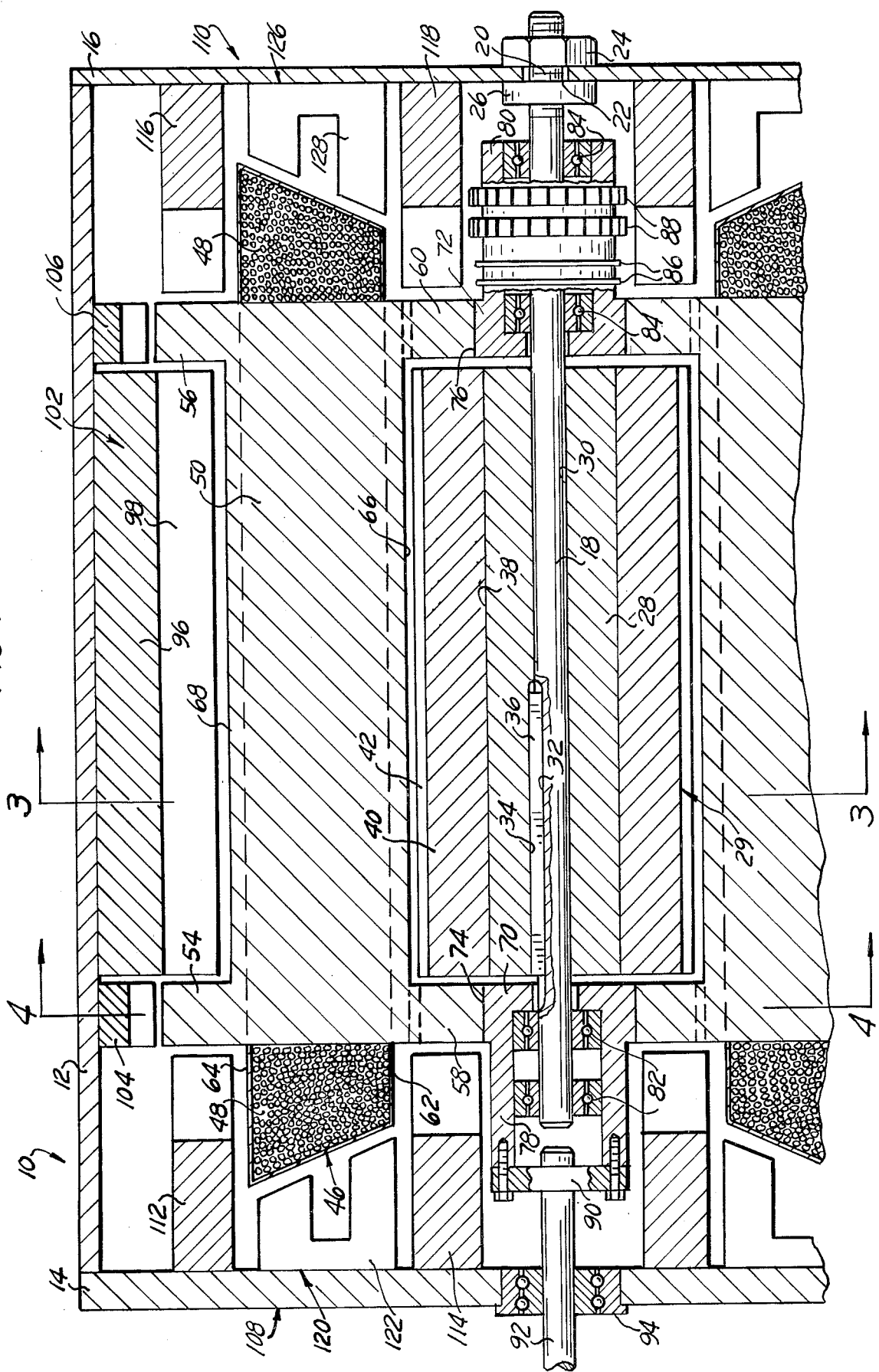
FIG. 1 is a partial longitudinal sectional view of a portion of a dynamoelectric machine according to the present invention.

Referring now to the drawing, a dynamoelectric machine 10 according to the present invention comprises a generally cylindrical housing 12, FIG. 1, closed at each end by end plates 14 and 16, the end plates 14 and 16 being fastened to the cylindrical housing 12 in any convenient manner such as by means of screws, not shown. A shaft 18 extends longitudinally through the housing 12, concentric with the wall thereof, and is held in a fixed position by being bolted, for example, to an end plate, such as end plate 16. For that purpose, the shaft 18 has a threaded end 20 projecting through an aperture 22 formed in the end plate 16 and a nut 24, when appropriately tightened on the threaded end 20 of the shaft 18, holds the shaft fixedly in position, as a result of the wall of the end plate 16 surrounding the aperture 22 being clamped between the bottom of the nut 24 and a shoulder 26 integrally formed on the end of the shaft 18. Additional securing means may be provided, not shown, such as pins, keyways and keys, and the like for preventing the shaft 18 from rotating relative to the end plates 14 and 16.

Figure 2:
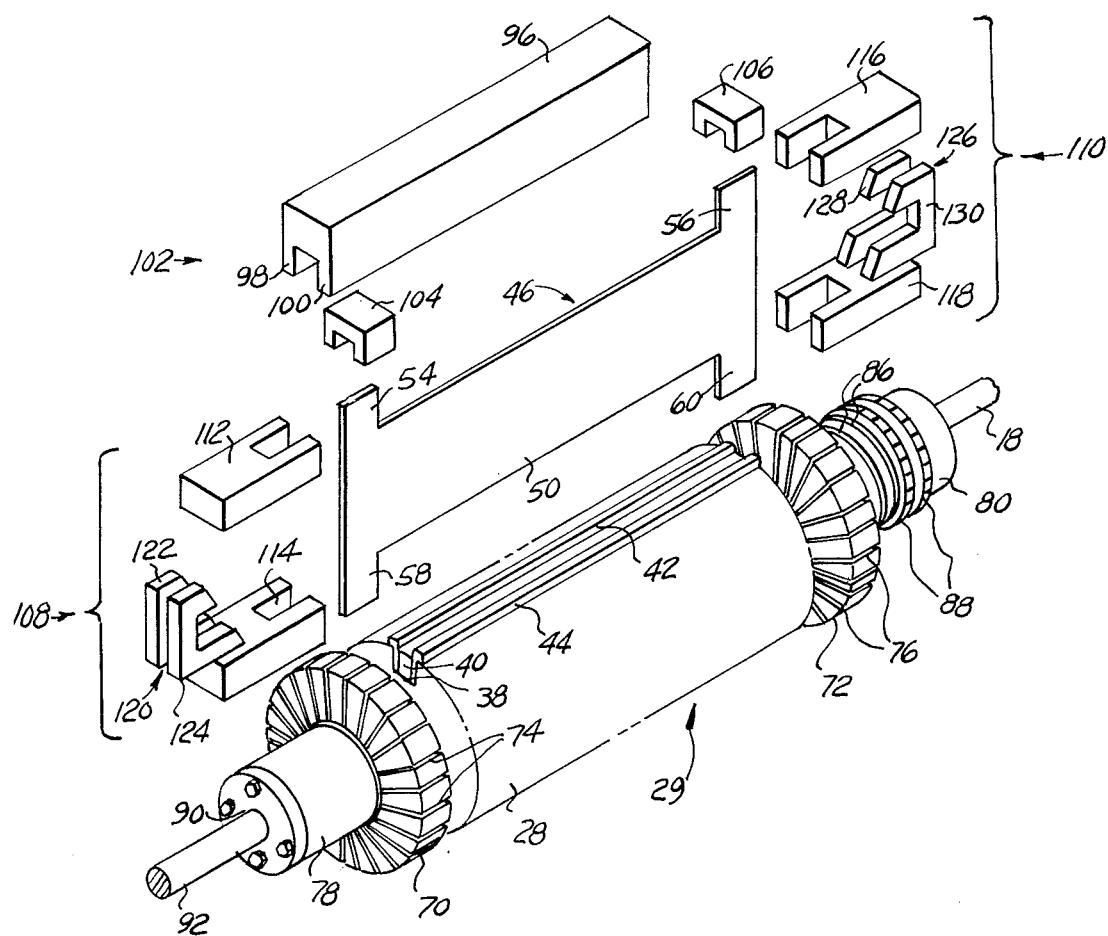
FIG. 2 is a schematic exploded perspective view of a portion of a dynamoelectric machine according to the present invention.
Figure 3:
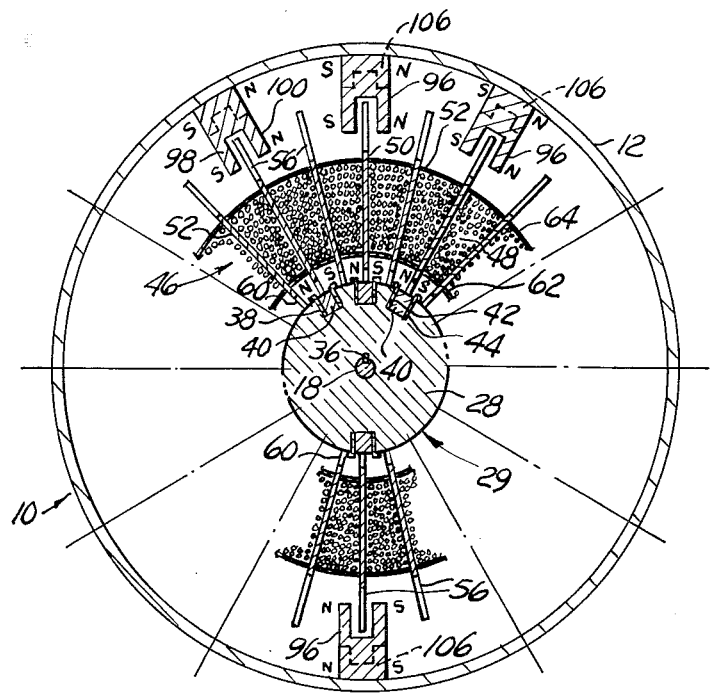
FIG. 3 is a transverse sectional view thereof along line 3–3 of FIG. 1.

The shaft 18 supports a hollow cylinder 28 having a longitudinal bore 30 through which the shaft 18 is press-fitted, for example, a longitudinal keyway 32 being formed in the periphery of the shaft 18, and a corresponding keyway 34 being formed in the bore 30 in the cylinder 28, a key 36 being disposed in the mating keyways 32 and 34. The outer periphery of the cylinder 28 has a plurality of radially disposed slots 38, FIGS. 1–3, each accepting a single elongated permanent magnet bar 40 and its pole pieces 42 and 44, made of magnetically permeable material, the pole pieces 42 and 44 being L-shaped in section, as shown at FIG. 3. In the structure illustrated, the cylinder 28, forming part of the inner stator 29, is made of a non-magnetic material, preferably aluminum or an aluminum alloy, and is provided with twelve such slots 38 on its periphery, each slot containing a permanent magnet bar 40 and its associated pole pieces 42 and 44 fastened in the slot by press-fitting, for example. Each permanent magnet bar 40 is magnetically oriented transversely such that opposite magnetic poles are disposed on opposite sides of the magnet bar 40 with the pole pieces 42 and 44 being alternate "north" and "south" poles for example. Consequently, the magnetic poles about the periphery of the cylinder 28, together defining the inner stator 29 of the dynamoelectric machine 10 of the invention, are alternate N, S, N, S, etc. poles, providing a total of twelve N poles alternating with a total of 12 S poles, regularly disposed about the periphery of the inner stator 29.

The rotor 46 of the dynamoelectric machine 10 is formed of a plurality of windings 48 each wound around a flat relatively thin magnetic core 50 made of a magnetically permeable material, such as steel, ferrite and the like. In the example illustrated, there are twelve such windings 48 wound around every other magnetic core 50, one further magnetic core 52 being disposed between consecutive windings 48, as disclosed in detail in U.S. Pat. No. 3,602,749. As explained in the aforesaid patent, all the coils or windings 48 are electrically connected and are wound around their respective magnetic cores 50, such that at any given time, the electric current circulating in the coils or windings 48 circulates in the same direction, therefore creating in the magnetic cores 50 a magnetic field radially directed. As the electric current circulates in all the windings 48 in the same direction at a given time, magnetic fluxes in the same direction are provided by each core 50, while each core 52 provides a magnetic flux in an opposite direction.

Figure 4:
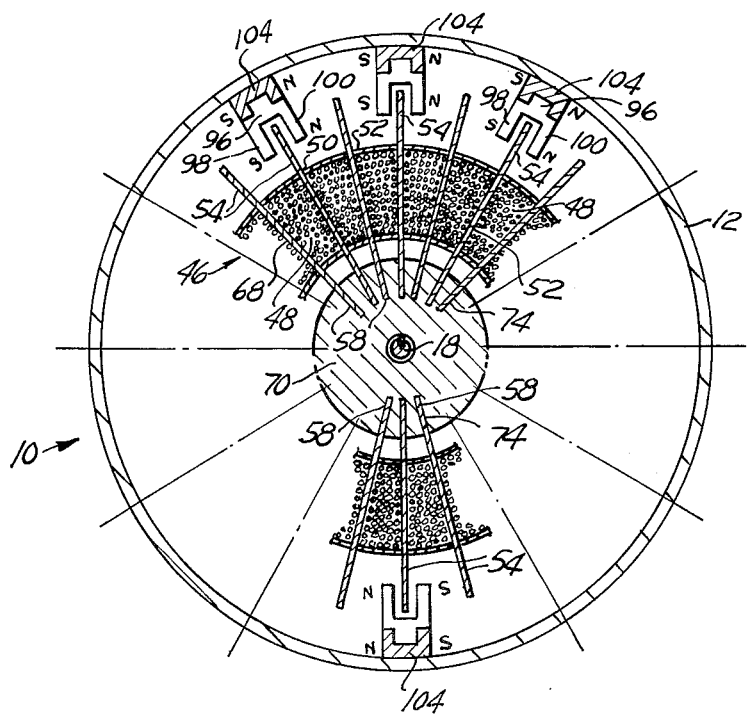
FIG. 4 is a transverse sectional view thereof about line 4—4 of FIG. 1

Each magnetic core 50 and 52 has an extension radially disposed at each end of the core and extending outwardly. Such a core extension on one end of the magnetic core 50 is designated by numeral 54 at FIG. 1, and the other extension at the other end of the magnetic core is designated by numeral 56. Similarly each magnetic core 50 or 52 is provided with an inwardly projecting radial extension 58 on one end and an inwardly projecting radial extension 60 on the other end. The magnetic cores 50, with the windings 48 wound therearound, and the alternate magnetic cores 52, between windings 48, thus define a hollow cylindrical rotor 46, provided with an inner cover 62 and an outer cover 64 made, for example, of varnished impregnated fabric or paper and from which projects the inner edge 66 and the outer edge 68, respectively, of the magnetic core 50 or 52, the rotor 46 being supported, on both ends thereof, by way of a hub or disc 70, on one end, and a hub or disc 72 on the other end. Each support disc 70 is provided with radially disposed slots 74, FIG. 4, in which are press-fitted or otherwise fastened the extensions 58 of the magnetic cores 50 and 52. The hub or disc 72 on the other end of the rotor 46 is similarly provided with radial slots 76 in which are press-fitted or otherwise fastened the inwardly projecting core extensions 60. The hub 70 is provided with a cup-like integral extension 78 on the interior of which are press-fitted, or otherwise fastened the outer races of a pair of ball bearings 82, the inner races of which are fitted over the end of the shaft 18. In a similar manner, the hub or disc 72 is provided with an integral cup-like extension 80 supported from the shaft 18 by way of ball bearings 84. The cup-like hub extension 80 supports externally a pair of rings 86, to which are connected the terminal of the windings 48, and a pair of commutator rings 88, in turn appropriately connected to the rings 86. A pair of brushes, not shown, are used for bringing electrical current to the commutator 88 (motor mode) or for recovering the electric current produced by the dynamoelectric machine (generator mode). On the end of the cup-like hub extension 78 is fastened, by means of a coupling 90, an output (motor) or input (generator) shaft 92 journalled through the end plate 14 by means of ball bearings 94 or the like. In structures wherein the coupling 90 is a flexible coupling, some support and bearing means, not shown, is provided for peripherally and rotatably supporting the cup-like hub extension 78.

The magnetic pole pieces 42 and 44 of the magnets 40 of the inner stator 29 are adapted to react with the magnetic flux at the edge 66 of the rotor magnetic cores 50 and 52. U-shaped elongated permanent magnets 96 are mounted on the inner surface of the housing 12, and present alternate "south" and "north" poles on the ends of their legs 98 and 100 for interreaction with the outer edge 68 of the rotor magnetic cores 50 and 52. The permanent magnets 96 may be cemented or otherwise fastened to the inner surface of the housing 12 and, in the example illustrated, define an outer stator 102 consisting of twelve such permanent magnets 96 disposed at regular intervals and forming alternate S, N, S, N, S, N, ... poles.

The outer stator 102 also comprises a plurality of small U-shaped permanent magnets 104 mounted proximate to one end of the long magnets 96 and adapted to interreact with the outwardly projecting magnetic core extensions 54, and a plurality of small U-shaped permanent magnets 106, similarly disposed on the other end of each magnet 96, for interreaction with the magnetic core extensions 56. There are, in the example of structure illustrated, twelve magnets 104 and twelve magnets 106, oriented magnetically in the same manner as the magnets 96.

The present invention further contemplates providing end stators 108 and 110 disposed respectively on each end of the housing 12 and supported respectively by the end plates 14 and 16. The end stator 108 comprise a plurality of horseshoe-shaped magnets 112, twelve in number in the example illustrated, adapted to interreact with the side edge of the core extensions 54 and a plurality of symmetrically disposed horseshoe-shaped magnets 114 also twelve in number in the example illustrated, adapted to interreact with the side edge of the magnetic core extensions 58. The other end stator 112, similarly, comprises a plurality of small horseshoe magnets 116 for interreacting with the side edge of the magnetic core extensions 56 and small horseshoe magnets 118 adapted to interreact with the side edge of the magnetic core extensions 60. The magnets 116 and 118 are each twelve in number in the example of structure illustrated.

The magnets 112, 104, 96, 106 and 116 are transversely aligned in such manner as to all have an identical pole presented to the core extensions 54, 68 and 56 at a given time during rotation of the rotor 29. The magnets 114, 40 and 118 are transversely aligned such as to all present a magnetic pole of the same polarity to the core extensions 58, 66 and 60 at a given time during rotation of the rotor 29. Radially, however, the magnetic poles presented by the magnets 114, 40 and 118 are opposite polarity to those presented by the magnets 112, 104, 96, 106 and 116.

The end stator 108 in addition comprises a plurality of pairs 120 of horseshoe-shaped relatively thin magnets 122 and 124, adapted to interreact with the corresponding lateral end of the windings 48 and the corresponding lateral end of the magnetic cores 50 and 52. The other end stator 110 comprises a plurality of pairs 126 of relatively thin horseshoe-shaped magnets 128 and 130, adapted to interreact in a similar manner with the other lateral end of the magnetic cores 50 and 52 and windings 48. In the example of structure illustrated, there are twelve pairs 120 and 126 of end magnets, and each magnet of a pair is reversed relative to the other such that N, S, N, S, . . . poles alternate at the ends of the inner leg of the magnets while S, N, S, N . . . poles alternate at the ends of the outer leg of the magnets.

It can thus be seen that the particular structure of the winding magnetic cores of the rotor of the present invention provided with end radial extensions results in forming a plurality of interreacting magnetic gaps with the permanent magnets of the inner stator, the permanent magnets of the outer stator and the permanent magnets of the end stators, with the advantage that the efficiency of dynamoelectric machines constructed according to the invention is greatly increased as compared to conventional dynamoelectric machines providing only a limited number of magnetic gaps between rotors and stators. It will be appreciated by those skilled in the art that although the magnets of the stators are preferably permanent magnets of high reluctance, electromagnets may be substituted for some or all of such permanent magnets without departing from the spirit or scope of the present invention.

Having thus described the present invention by way of a typical example of structure according to the principles of the invention, modifications whereof will be apparent to those skilled in the art,

What is claimed as new is as follows:

1. In a dynamoelectric machine having an inner stator comprising a plurality of magnets, an outer stator comprising a plurality of magnets, a pair of end stators comprising a plurality of magnets and a rotor mounted for rotation between said stators, said rotor comprising a first plurality of flat longitudinally elongated substantially rectangular radially disposed thin magnetic cores having electrical windings wound longitudinally therearound and a second plurality of flat longitudinally elongated substantially rectangular radially oriented thin magnetic cores disposed each between consecutive wound magnetic cores, the improvement comprising each of said magnetic cores having at least at an end thereof a first extension integral with said rectangular plate projecting radially toward said outer stator and a plurality of magnets in said outer stator disposed such as to form a radially magnetic gap with said first core extension.

2. The improvement of claim 1 further comprising a plurality of magnets in at least one of said end stators disposed such as to form an axial magnetic gap with said first core extension.

3. The improvement of claim 1 further comprising said first core extension at each end of said magnetic cores and a plurality of magnets in each of said end stators disposed such as to form an axial magnetic gap with said first core extension.

4. The improvement of claim 1 further comprising a second integral magnetic core extension projecting radially toward said inner stator at at least one end of said magnetic core and a plurality of magnets in at least one of said end stators disposed such as to form an axial magnetic gap with said second core extension.

5. The improvement of claim 1 further comprising a second integral magnetic core extension projecting radially toward said inner stator on each end of said magnetic core and a plurality of magnets in each of said end stators disposed such as to form an axial magnetic gap with said second core extension.

6. The improvement of claim 4 further comprising a hub member for rotatably supporting said rotor, said hub member having a radial slot corresponding to each of said second core extension for fitting of said second core extension in said slot.

7. The improvement of claim 6 further comprising a rotatable shaft having an end affixed to said hub member.

8. The improvement of claim 5 further comprising a pair of hub members for rotatably supporting said rotor, each of said hub members having a radial slot corresponding to each of said second core extensions for fitting of each of said second core extensions in said slot.

9. The improvement of claim 8 further comprising a rotatable shaft having an end affixed to one of said hub members.

10. The improvement of claim 9 further comprising commutator means affixed to the other of said hub members.

11. The improvement of claim 1 wherein said magnets are permanent magnets.

12. The improvement of claim 2 wherein said magnets are permanent magnets.

13. The improvement of claim 3 wherein said magnets are permanent magnets.

14. The improvement of claim 4 wherein said magnets are permanent magnets.

15. The improvement of claim 5 wherein said magnets are permanent magnets.

* * * * *